United States Patent Office 3,520,532
Patented July 14, 1970

3,520,532
DOCUMENT HANDLING MECHANISM
Delbert D. Towne, Rochester, Minn., assignor to International Business Machines Corporation, Armonk, N.Y., a corporation of New York
Filed July 11, 1968, Ser. No. 744,231
Int. Cl. B65h 3/04, 1/00
U.S. Cl. 271—34
5 Claims

ABSTRACT OF THE DISCLOSURE

A document handling mechanism which includes a hopper for supporting documents to be processed and a separator assembly for removing documents serially from the top of a deck supported within the hopper. A vacuum restraint device is provided to cause the last document of a deck supported in the hopper to have increased resistance to movement with respect to the document supporting surface and thereby prevent jams occasioned by premature movement into the separator mechanism of the last document or the last few documents of the deck.

BACKGROUND OF THE INVENTION

This invention pertains to document handling and more particularly to an improved hopper mechanism to prevent document jams when only a limited number of documents remain to be fed into the associated document processing device.

A separator assembly used to deliver documents from the top of the stack or deck must deliver documents while simultaneously preventing jams caused by succeeding documents attempting to pass through the separator mechanism prematurely. This function is normally accomplished by a mechanism including a picker device which shears the uppermost sheet from the balance of the deck, a separator device which transports the picked document out of the hopper along the document path and a restraint device which slips with respect to the separator device but serves to shear a second document away from the uppermost document if on occasion, two are picked from the stack simultaneously or are otherwise simultaneously present at the separator.

This structure is adequate with the adjustments normally provided to deliver each document from the stack that rests upon an underlying stationary document. Under these conditions, the friction between the documents is sufficiently uniform and great enough to normally prevent the picker from picking the next succeeding document until the separator is prepared to accept it. When the last document or last few documents of the stack are approached, the friction between the document supporting surface of the hopper bed plate and the last document becomes a factor. This frictional resistance is normally markedly less than the reistance between adjoining sheets in the stack with the results that the final sheet or sheets of the stack tend to move toward the separator, buckle and cause a jam which both interrupts processing and damages the documents.

This condition can be overcome by creating a document engaging surface on the hopper bed plate that has frictional characteristics similar to or greater than a document. This condition is difficult to simulate for a wide range of documents and often requires the use of surfacing materials that are not satisfactorily wear resistant with the result that when the hopper is empty the picker damages the confronting surface.

SUMMARY OF THE INVENTION

In the document handling device of the present invention, a vacuum actuated restraining force is utilized between the lowermost document of the stack supported in the hopper and the support surface to enable the restraint means in cooperation therewith to overcome the frictional force of the picker device prior to direct contact between the picker and such final document and to avoid having the last document approach the separator prematurely, causing a jam. The structure is of simple design and requires no moving parts when a source of vacuum exists in the environment. In attaching to a vacuum system the vacuum restraint includes a flow restriction to prevent reduction of the effectiveness of the existing vacuum system when the hopper is unloaded. This in no way diminishes the effectiveness of the vacuum restraint since the latter device utilizes an essentially non flow operation and accordingly does not require any additional vacuum capacity.

It is an object of this invention to provide a device for preventing last document jams which is flexible over a wide range of document materials and sizes and has long life. It is a further object of the invention to provide a device using facilities commonly available in machine environments and requiring no additional moving parts. The foregoing and other objects, features and advantages of the invention will be apparent from the following more particular description of a preferred embodiment of the invention, as illustrated in the accompanied drawings.

DETAILED DESCRIPTION

Figure 1:
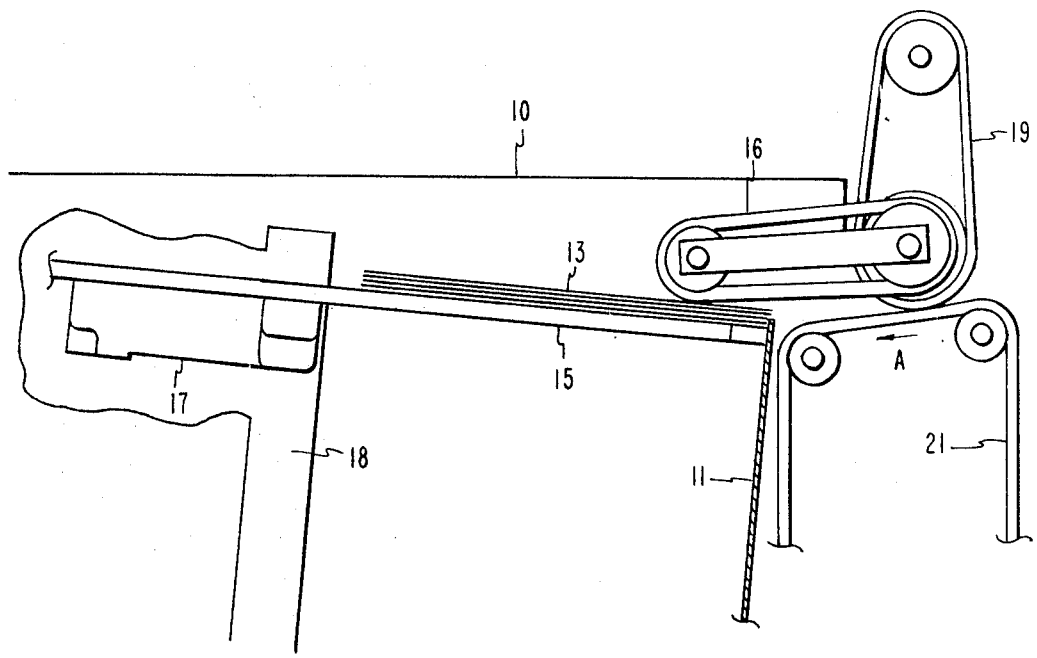
FIG. 1 is a schematic side elevation, partly broken away and partly in section of the hopper and separator portion of a document handling device including the present invention.

As seen in FIG. 1 the document handling device includes a hopper with a vertical sidewall 10 and a slightly inclined front wall 11 toward which a document stack 13, mounted on a moveable bed 15 is inclined. The bed 15 has rigidly connected thereto a bracket 17 which projects through the slotted opening 18 in hopper sidewall 10 and connects to a means (not shown) for selectively raising and lowering the hopper bed 15 and deck 13 to the operative position. Documents are moved from the hopper serially one at a time to the document path of the associated machine by a picker-separator assembly. The uppermost document on the bed-supported deck 13 is sheared away from the remaining documents by a picker belt 16 which travels at a speed slightly less than the tranport speed of the associated machine. The picked document thereupon moves into engagement with the separator belt 19 which has a high friction surface and accelerates the document to the transport speed of the machine. Opposing the separator belt is a restraint belt 21 which moves very slowly in the direction of arrow A, opposite the direction of motion of separator belt 19. The coefficient of friction of the surface of restraint belt 21 is substantially less than the coefficient of friction of the surface of separator belt 19 with the result that a document passing therebetween is driven by the separator belt. However, if two sheets of paper enter the separator mechanism simultaneously, the frictional engagement of the restraint belt 21 with the lower of the plurality of sheets will cause the lower sheet to be sheared from the upper sheet and preclude the simultaneous delivery of multiple documents through the separator.

Figure 2:
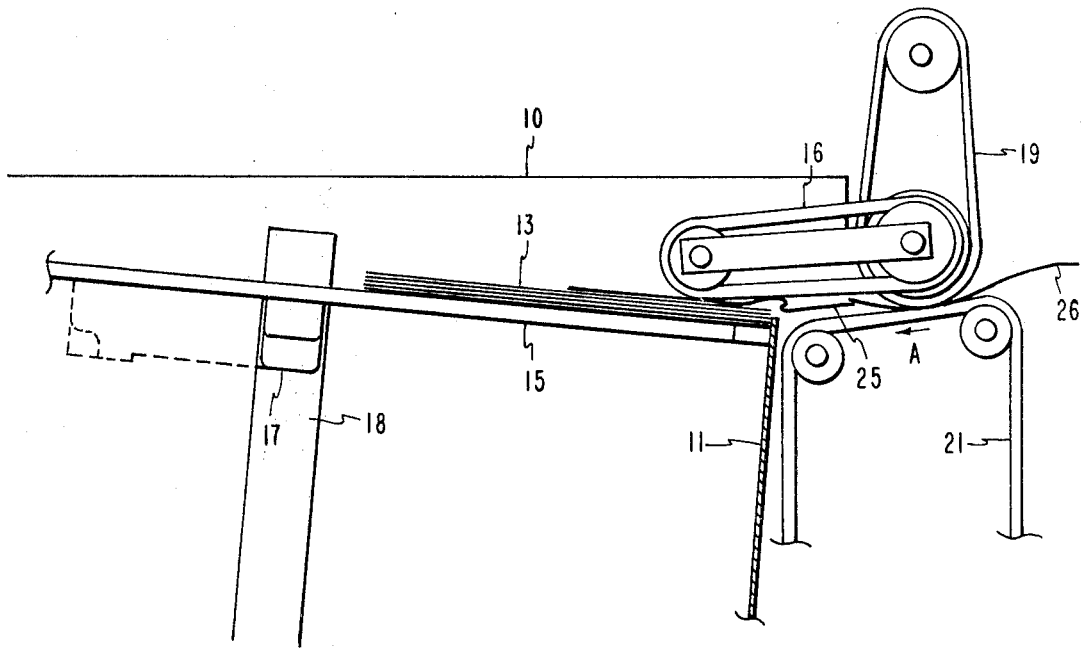
FIG. 2 is a view similar to that of FIG. 1 illustrating a document jam condition.

As seen in FIG. 2, when a second document 25 attempts to pass through the separator assembly before the preceding document 26 has cleared the device, it is sometimes possible for the document to continue to proceed toward separator belt 19 while being restrained from passage through the separator thereby causing the document to buckle and fold back upon itself as shown. It is normally possible to adjust the pressure of the picker belt or other picker means with respect to the top of the document deck, by an adjustment provided for this purpose. The adjustment permits that balance of the forces on the documents which will assure that the uppermost document is carried through the separator assembly and into the document guideway while any succeeding document is either restrained on the deck 13 through the frictional forces generated with the underlying document or is sufficiently restrained by the combination of the frictional contact with the underlying document and the restraint belt to prevent buckling of the document as well as exclusion from the separator. However, even when such a balance is achieved with respect to successive documents within the stack or deck, when the final documents are approached, the tendency of the final document to slide on the document supporting surface of the bed plate is liable to permit movement of the final document or documents irrespective of the correct adjustment attained theretofore. It is probably that without further precautions the reduction of the restraining forces acting on the last document or last few documents would permit such documents or documents to move toward the separator belt initiating a document jam.

To overcome the problem of final document jams, various means have been suggested such as changing the surface of the bed plate or placing an insert of material on the bed plate surface that affords increased frictional engagement with an overlying document. Changing the surface characteristics of the bed plate has not been wholly successful since it has not been possible to achieve frictional surface coefficients that are universally applicable throughout the range of document materials used; and when insert materials have been placed on the surface opposing the picker belt, it has been found that high rates of wear occur when the picker belt comes in contact with the surface material. This causes a change in the frictional characteristics and the balance of forces exerted upon the documents by the picker belt and the insert surface.

Figure 3:
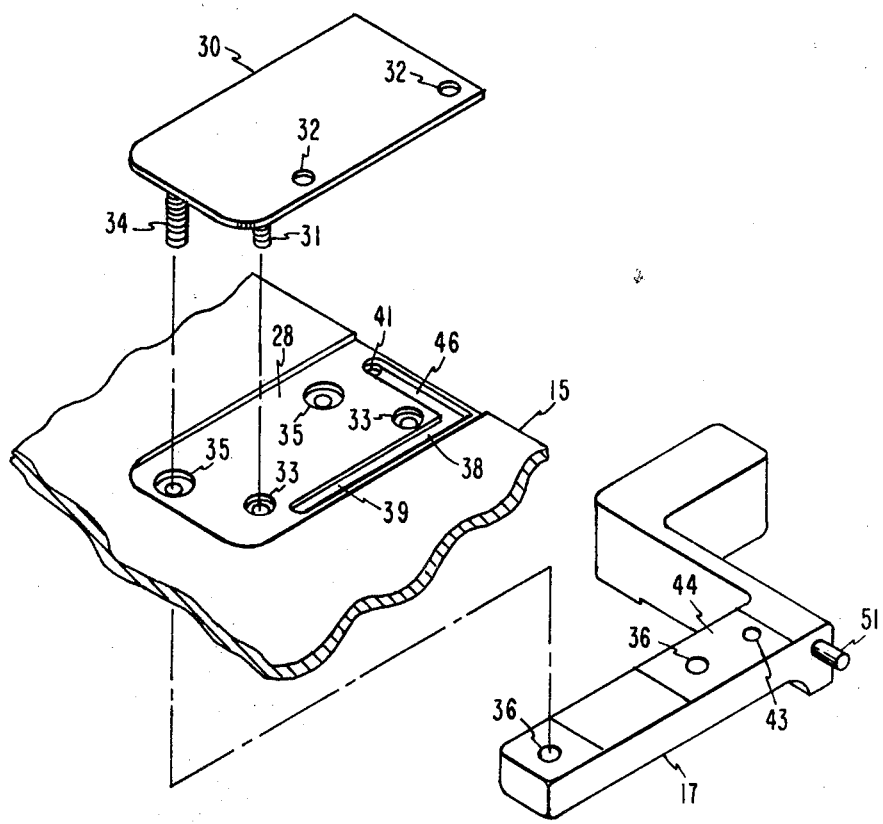
FIG. 3 is an exploded isometric view of a portion of the hopper bed plate and support bracket.
Figure 5:
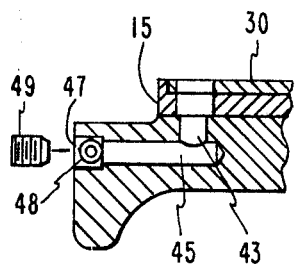
FIG. 5 is an enlarged section view taken along line 5—5 of FIG. 4.
Figure 4:
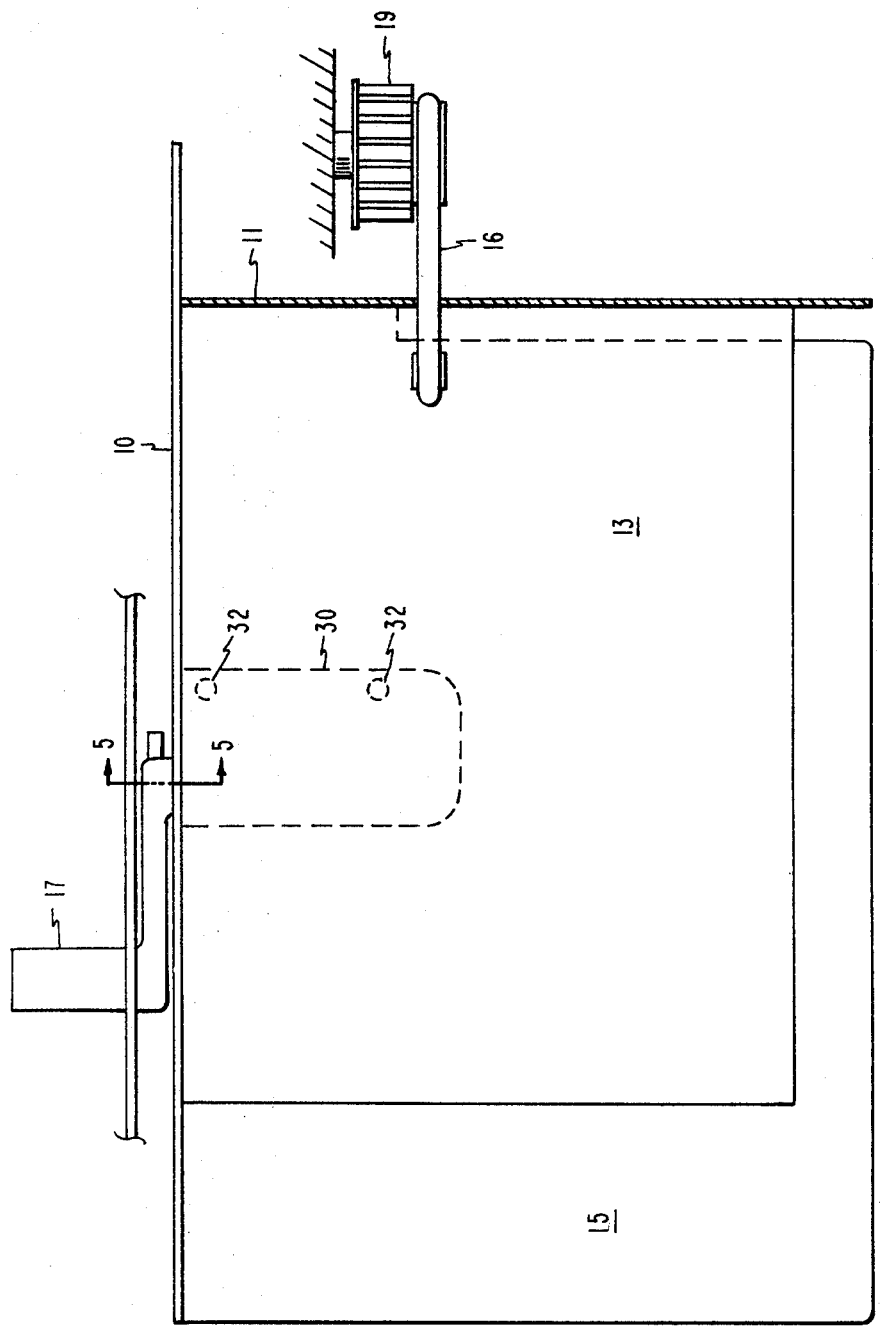
FIG. 4 is a schematic plan view, partly in section and partly broken away, of the hopper and separator of FIG. 1.

Referring to FIGS. 3, 4, and 5, bed plate 15, which supports the documents within the hopper has a recessed portion 28 adjacent the vertical hopper wall 10. A plate member 30 is fitted securely within the recess to present a continuous co-planner document engaging upper surface which is interrupted by a pair of apertures 32. The plate member 30 is secured to the bed plate 15 by a pair of weld nuts 31 which project from the bottom surface of the plate 30 and pass through apertures 33 in bed plate 15. A second pair of weld nuts 34 pass through the bed plate apertures 35 and apertures 36 in the underlying bracket 17 to secure plate 30, bed plate 15, and bracket 17 together as a unitary structure. The bed plate recess 28 has an angular channel 38 formed therein with one leg 39 of the channel communicating with the plate member apertures 32 which extend from the document supporting surface and another leg 40 which terminates at a bore 41 extending to the bottom surface of the bed plate. The bore 41 is axially aligned with a corresponding bore 43 in bracket 17. As seen in FIG. 5, the bracket vertical bore 43 extends from the machined surface 44 on the upper side of bracket 17. A horizontal bore 45 extends from the bracket side surface, intersects vertical bore 43, and has an enlarged internally threaded terminal portion 47 at the end intersecting the side wall. A second horizontal bore 48 intersects the first horizontal bore 45 at the latter's juncture between the enlarged and reduced diameters. An externally threaded set screw 49 is received in the enlarged diameter portion 47 of first horizontal bore 45 and is insertable to a position of partial restriction of the fluid path at the juncture of the first and second horizontal bores 45 and 48 respectively. A flexible tube 51 which communicates with a source of vacuum is inserted into and sealed within the second horizontal bore 48 to effect a vacuum restraint with respect to the lowermost document of a stack 13 in the hopper which adjoins the apertures 32 communicating through the bed plate document supporting surface.

In operation, as the last document is approached, the vacuum restraint exerted along the interface between the document supporting surface of the hopper and the lowermost surface of the document stack 13 increases the restraint resisting relative movement between the lowermost document and the supporting surface of the bed plate to prevent the lowermost document or documents from prematurely being urged toward the separator belt 19. Using two apertures 32 which are transversely spaced results in a more uniformly applied restraining force such that when the last document is picked there is little tendency for the document to rotate and become disoriented prior to contact by the associated machine separator and transport mechanism.

Since the effectiveness of the vacuum restraint is not a function of fluid flow through the vacuum line 51 but requires only that a vacuum restraint be established at the apertures 32 in what is essentially a no-flow condition, it is desirable to place some restriction between the source of vacuum and the apertures to prevent the vacuum system from being unduly comprised by the influx of air when apertures 32 are uncovered. This can be accomplished by various means; but in the illustrated structure of the present device, the resistance to flow is established by using a connecting tube 51 and passageway of substantial length and of fairly small diameter to establish restricted flow. Further restriction provided by the set screw 49 which is inserted to a point where it partially restricts the junction of the horizontal bores 45 and 48.

This device can also be utilized to detect the presence of the last document by utilizing a vacuum switch which communicates with and responds to the pressure increase in the bed plate channel 38 as the vacuum condition is terminated by removal of the last document.

While the invention has been particularly shown and described with reference to a preferred embodiment thereof, it will be understood that various changes in form and detail may be made therein without departing from the spirit of the invention.

What is claimed is:

1. A document handling device wherein documents are processed serially one at a time including a hopper comprising a moveable bed plate mounted within said hopper and having a document supporting surface; separating assembly means for removing documents from the top of a deck supported on said bed plate surface; aperture means in said bed plate extending from said documents supporting surface; and vacuum means connected to said aperture means.

2. The document handling device of claim 1 further comprising passage means interconnecting said aperture means and said vacuum means and flow restricting means disposed in said passage means for restricting flow through said passage means.

3. The document handling means of claim 2 wherein said bed plate is inclined in the direction of document travel from said hopper.

4. The document handling device of claim 2 wherein said aperture means comprises a pair of apertures communicating with the document supporting surface of said bed and transversely spaced with respect to the direction of document travel from said hopper.

5. The document handling device of claim 4 wherein said separator assembly means includes picker means, separator means and restraint means; and wherein the restraint induced by said vacuum means and said restraint means acting on the last document of a deck supported on said bed plate document supporting surface cooperate to prevent said last document from being controlled by said separator means until the document preceding said last document has been removed from a position overlying said last document.

References Cited

UNITED STATES PATENTS 3,035,834  5/1962  Bottrell _____ 271—34

EDWARD A. SROKA, Primary Examiner

U.S. Cl. X.R.

271—62